No. 642,238. Patented Jan. 30, 1900.
J. MANNING.
BICYCLE.
(Application filed Mar. 11, 1899.)
(No Model.)
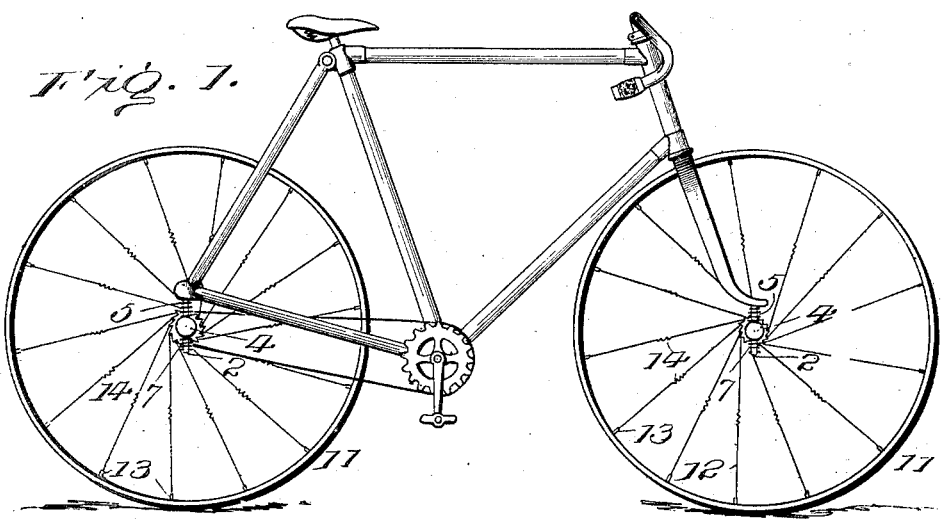
Fig. 1.
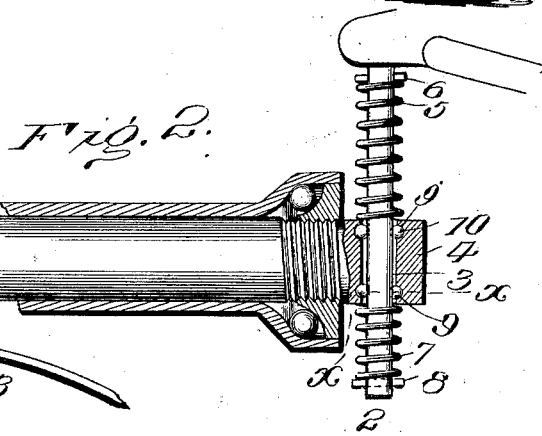
Fig. 2.
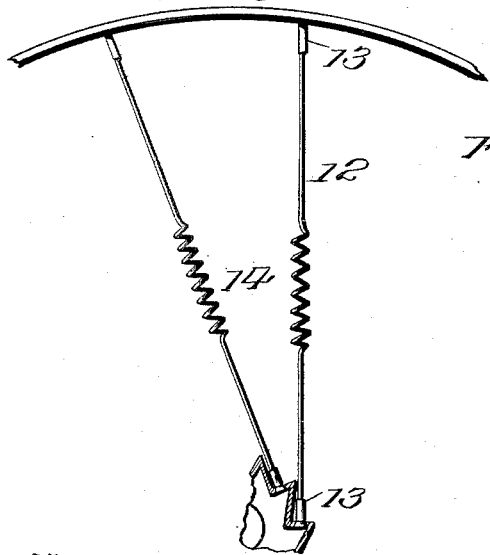
Fig. 4.
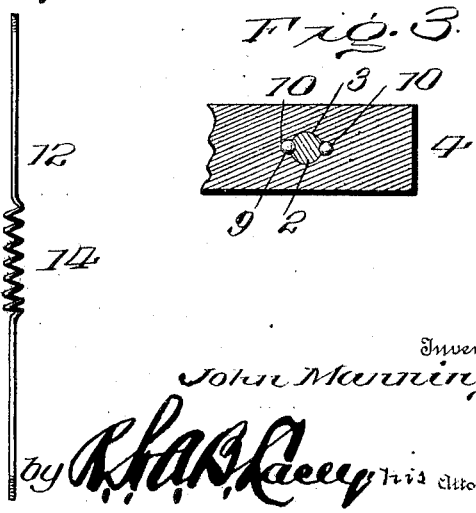
Fig. 5.
Fig. 3.
Witnesses
Inventor
John Manning
by R. S. & A. B. Lacey his Attorneys

UNITED STATES PATENT OFFICE.

JOHN MANNING, OF AGENDA, KANSAS.

BICYCLE.

SPECIFICATION forming part of Letters Patent No. 642,238, dated January 30, 1900.

Application filed March 11, 1899. Serial No. 708,709. (No model.)

*To all whom it may concern:*

Be it known that I, JOHN MANNING, a citizen of the United States, residing at Agenda, in the county of Republic and State of Kansas, have invented certain new and useful Improvements in Road-Vehicles; and I do hereby declare the following to be a full, clear, and exact description of the invention, such as will enable others skilled in the art to which it appertains to make and use the same.

This invention aims to secure all the advantages of pneumatic tires as applied to the wheels of bicycles, velocipedes, and vehicles of every description without being liable to the objections urged against the use of such tires. The purpose is to obviate jar and jolt and take up vibration and secure ease and comfort to the rider.

The improvement consists of the novel features, peculiar structural arrangements, and combinations of the parts, which hereinafter will be more fully described and claimed.

Referring to the drawings forming a part of this specification, and in which corresponding and like parts are indicated by the same reference characters, Figure 1 is a side elevation of a bicycle constructed in accordance with and embodying the essential features of the invention. Fig. 2 is a detail transverse section on a larger scale. Fig. 3 is a section on the line X X of Fig. 2. Fig. 4 is a detail view of the wheel. Fig. 5 is a detail view of a spoke.

The bicycle-frame 1 may be of any form, pattern, or make and is provided with front and rear pendent extensions 2, which have free movement in openings 3 at the ends of the axles 4. Coil-springs 5 surround the extensions 2 and are confined between the terminals of the axles and pins or stops 6, applied to the said parts 2. These springs support the load and cushion it. Other springs 7 surround the parts 2 and come between the axles and pins or stops 8. These springs 7 supplement the action of the springs 5 and prevent a too-rapid upward movement of the frame when rebounding. The opposite sides of the extensions 2 are grooved, forming races 9, in which balls 10 travel, said balls being located in pockets or seats formed in the inner and the outer walls of the openings 3.

The wheels are of like construction and comprise flexible spring-rims 11 and spring-spokes 12, the latter having their ends threaded right and left and connected by the usual nipples 13 with the hub and rim. The spokes have a staggered and tangent arrangement and are formed with spring portions 14, the latter being coils of the wire from which the spokes are formed. A wheel constructed in the manner set forth is perfectly flexible and resilient and will compensate for vibration in about the same degree as a pneumatic tire and cannot be crippled by puncture or over-inflation.

From the foregoing it will be understood that various changes in the form, proportion, and minor details of construction may be resorted to without departing from the nature or spirit of the invention or sacrificing any of the advantages thereof.

Having thus described the invention, what is claimed as new is—

The combination with the frame having a pendent portion provided in opposite sides with longitudinal grooves, and an axle formed with opposite pockets at its ends and adapted to receive the pendent portion of the frame, upper and lower springs mounted upon the said pendent portion of the frame above and below the axle and confined between the latter and stops at the ends of the aforesaid pendent portion, and balls located in the aforementioned pockets and entering the grooves of said pendent portion, substantially as and for the purpose described.

In testimony whereof I affix my signature in presence of two witnesses.

JOHN MANNING. [L. S.]

Witnesses:
W. F. COWELL,
C. N. RIGGS.